Inventors
Roger L. Griffin
John H. Mains
by Roberts, Cushman & Grover
att'ys.

March 5, 1957 R. L. GRIFFIN ET AL 2,783,882

GRADING APPARATUS

Filed July 26, 1951 8 Sheets-Sheet 2

Inventors
Roger L. Griffin
John H. Mains
by Roberts, Cushman & Grover
Att'ys.

March 5, 1957 R. L. GRIFFIN ET AL 2,783,882
GRADING APPARATUS
Filed July 26, 1951 8 Sheets-Sheet 3

Inventors
Roger L. Griffin
John H. Mains
by Roberts, Cushman & Grover
att'ys.

GRADING APPARATUS

Filed July 26, 1951

8 Sheets-Sheet 4

Inventors
Roger L. Griffin
John H. Mains
by Roberts, Cushman & Grover
att'ys.

Inventors
Roger L. Griffin
John H. Mains
by Roberts, Cushman & Grover
att'ys.

Inventors
Roger L. Griffin
John H. Mains
by Roberts, Cushman & Grover
Att'ys.

Inventors
Roger L. Griffin
John H. Mains
by Roberts, Cushman + Grover
att'ys.

Inventors
Roger L. Griffin
John H. Mains
by Roberts, Cushman & Grover
att'ys.

United States Patent Office 2,783,882

Patented Mar. 5, 1957

2,783,882

GRADING APPARATUS

Roger L. Griffin, Marblehead, and John H. Mains, Beverly, Mass., assignors, by mesne assignments, to Swift & Company, Chicago, Ill., a corporation of Illinois Application July 26, 1951, Serial No. 238,616

14 Claims. (Cl. 209—88)

In the grading of leather inner soles, the practice has been manually to feed the individual soles into a thickness measuring machine and hand sort the soles in accordance with the indication of the machine—a slow and laborious procedure in which the accuracy of the grading depended largely upon the skill and care of the operator.

It is accordingly the principal objects of this invention to provide a grading machine which will grade innersoles or other sheet material in accordance with the thickness thereof, which will determine which soles are wedge shaped, which is entirely automatic in operation, which does not depend upon the skill of the operator to give consistent results, which can be readily adjusted to take innersoles of different sizes, which stamps the graded soles, which is rapid in operation, which is trouble free and requires a minimum of maintenance, which reduces the handling of the innersoles to a minimum and which advances the art generally.

In a principal aspect the invention contemplates apparatus for grading sheet material such as innersoles or other irregular shaped stock which apparatus comprises means such as a conveyor for feeding successive sheets along a predetermined path defined for example by one or more tracks or rails along which the sheets are propelled by means of a belt or other continuously moving member. Depending upon the number of groups or lots into which the sheets are to be graded, one or more grading stations are positioned along the path. The various stations are similar except for the thickness determining setting thereof, which when more than one station is required, is made greater for each succeeding station so that only maximum limit or setting must be made at each station, the minimum limit being determined by the setting of the preceding station. Each station includes gauging means, for example one or more grading rolls supported at the end of a respective bell crank to contact the upper surface of a sole or other sheet in the station which means is arranged to operate a gate to deflect or divert the sole from the path when the thickness thereof is less than the predetermined setting. To prevent the gauging means from giving false indications in the absence of a sole in the station detecting means, such as a finger for contacting the sole located beyond the gauging means in the direction of the travel of the sole, is interlocked either mechanically or electrically to prevent the opening of the gate.

In another aspect a second gate is located so that in its open position the gate intercepts the soles diverted by the first gate. The second gate is operated by the gauging means whenever the thickness of the sole is greater than a predetermined maximum setting so that such soles, which are generally termed "wedgies," i. e. the difference between the maximum and minimum thickness exceeds a selected value, are separated from the other soles having the same minimum thickness.

In another aspect the first gate is operated by an electrical solenoid which is energized from an external power source by means of a control circuit having at least two switches one of which is closed when the gauging means indicates a thickness less than the predetermined setting, the other switch being closed by the trip member of the detecting means only when a sole is in the station. To maintain the first gate in the open position for a sufficient length of time to permit the sole to pass therethrough and to prevent high measurements made subsequent to a minimum measurement from closing the gate the coil of a holding relay is connected in parallel with the gate solenoid and the normally open relay contacts are connected in parallel with the switch operated by the gauging means to complete a holding circuit for energizing the gate solenoid irrespective of the opening of the switch. To reset the gate and the holding relay, a further switch is connected in series with the control circuit. The further switch is operated by trip means located in front of the gauging means where it is contacted by the succeeding sole to open the switch and interrupt the circuit so that the gate closes.

A further feature of the invention is a magazine for holding a stack of soles or other sheet stock so that the lower surface of the bottommost sole is engaged by projections, which are preferably a plurality of pointed stylus pivotally mounted in a transverse row upon a slidable carriage, so that the sole is removed from the bottom of the stack by a reciprocal movement of the carriage for example by means of a power operated cam. To prevent nonengagement by the stylus when the stack has only a few soles thereupon, suction means are provided to draw the sole against the stylus, a gate restraining the movement of all but the bottommost sole. More specifically in a preferred construction, the magazine comprises an apertured base plate whereupon the stack rests and a plurality of upright members located upon either side of the base plate to provide lateral support for the stack. Preferably these upright members are provided with adjustable backing means, such as pins projecting from conjointly rotatable members for engaging opposed members whereby the magazine size can be varied to accommodate various sized soles. An adjustable stop or plate is located at the opposite end of the base plate from the gate so that the effecting magazine length can be varied. Preferably the stop is moved by a cam which is operated conjointly with the rotatable member so that a single operation adjusts the magazine to receive a stack of soles of any selected size.

These and other objects, aspects and features will be apparent from the following detailed description of a specific embodiment of the invention referring to drawings wherein.

The particular embodiment of the invention is a grading machine which is particularly adapted for grading inner soles. The soles are manually stacked in a magazine from which they are sequentially fed to a conveyor. At spaced locations along the conveyor are several grading stations, each of which has a gate arranged to divert to an auxiliary conveyor soles having a minimum thickness less than a predetermined setting of the station. The setting of each succeeding station is made greater than that of the preceding stations so that soles passing along the conveyor are separated into groups or lots having a minimum thickness not greater than the predetermined setting of the diverting station but greater than the predetermined setting of the preceding station. Each station is also provided with a second gate for separating "wedgies," i. e., soles with a different between the maximum and minimum thickness greater than a selected amount. Although any number of stations can be provided, it has been found convenient to use ten stations which grade from 1½ iron (1½/48 inch) to 6 iron (6/48) in steps of ½ iron.

Figure 3:
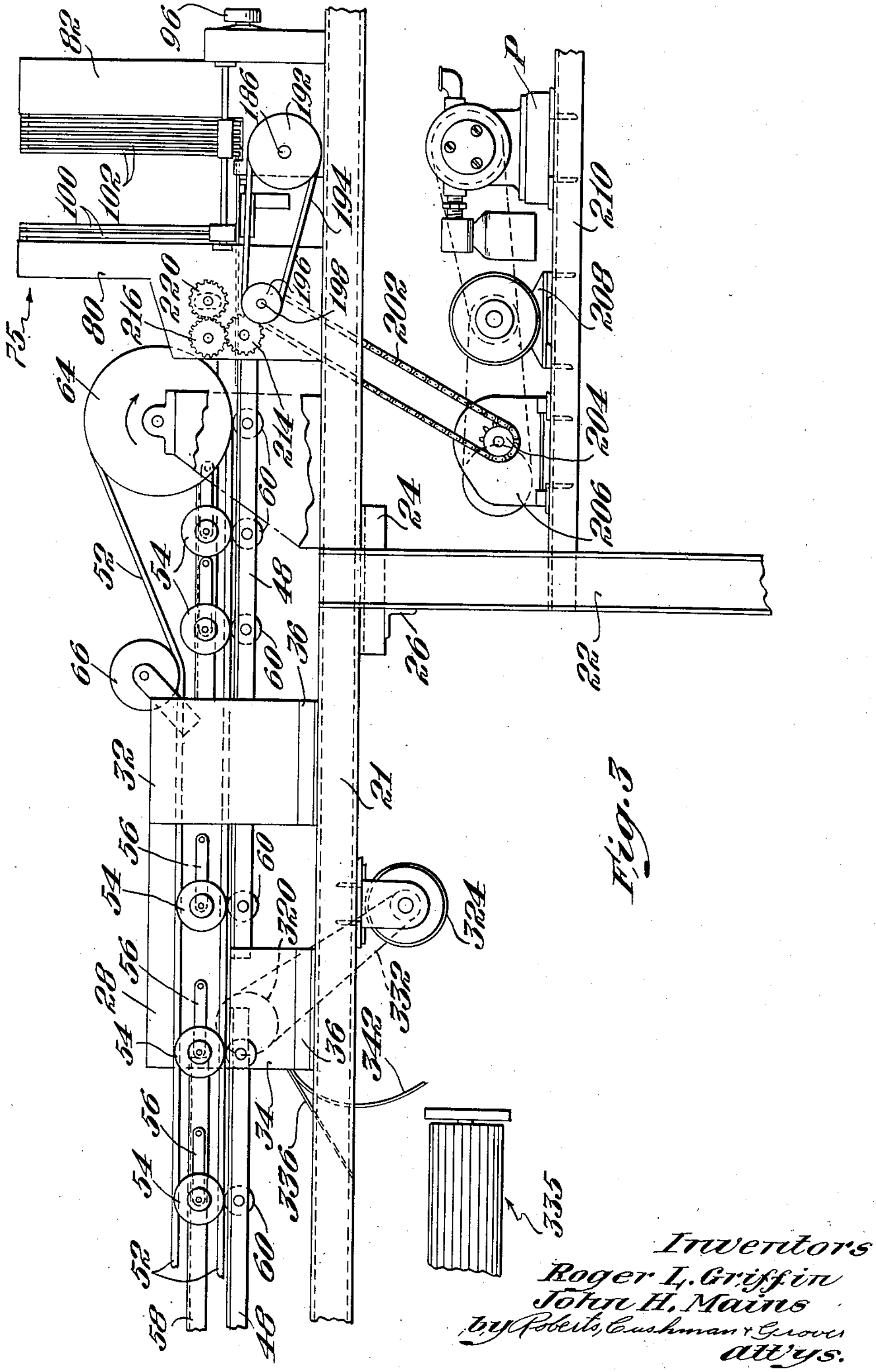
Fig. 3 is an enlarged side elevation view showing the details of the driving mechanism.
Figure 7:
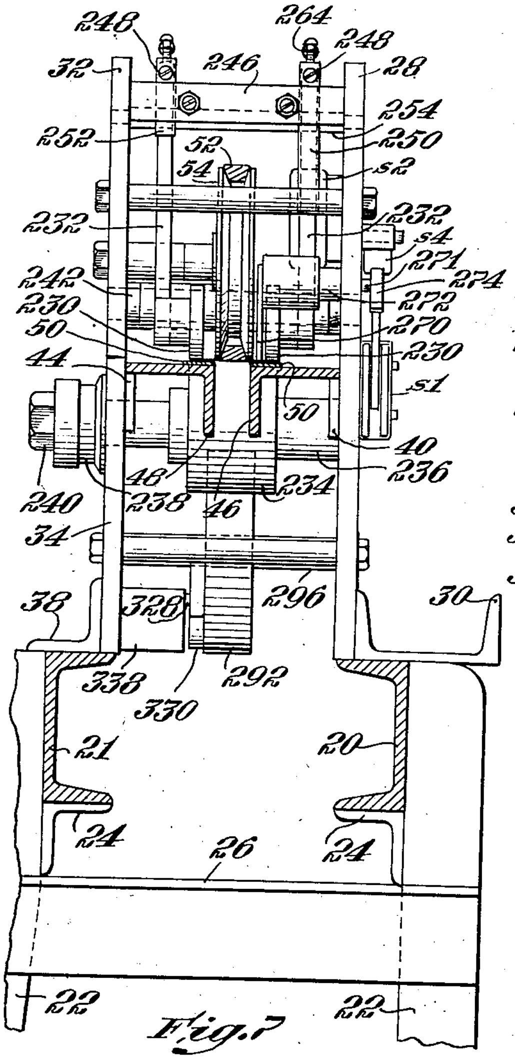
Fig. 7 is an enlarged sectional view on line 7—7 of Fig. 5.
Figure 8:
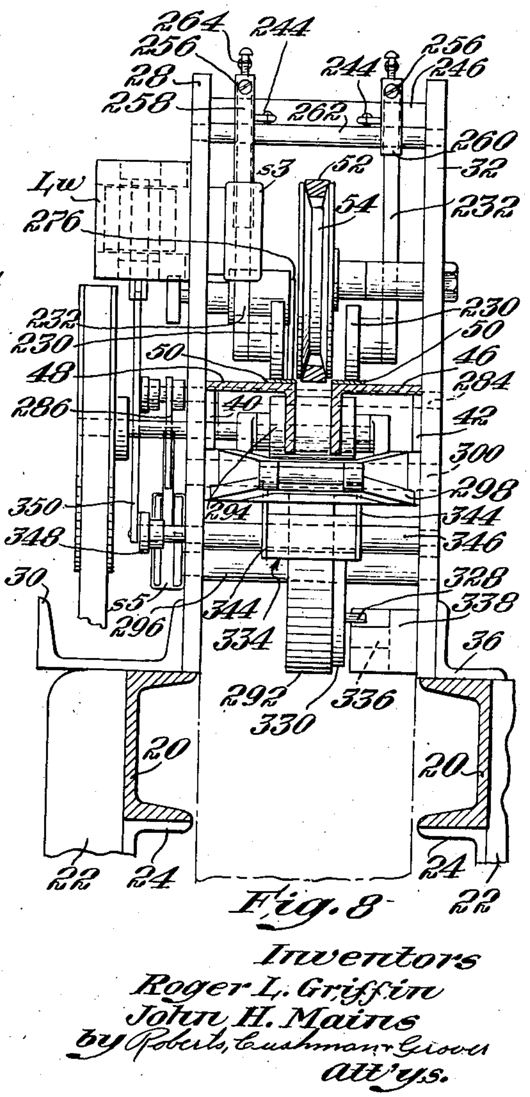
Fig. 8 is an enlarged sectional view on line 8—8 of Fig. 5.

As is best shown in Figs. 1, 3, 7 and 8 the grading machine comprises a frame formed of two channels 20 and 21 arranged with their flanges turned inwardly so that they are facing each other. The channels 20 and 21 are supported by a plurality of leg members 22 arranged in pairs which are disposed in spaced relationship. Adjacent each leg member 22 the corresponding channel is reinforced by a short angle member 24 which is located beneath the channels. The spacing of the channels 20 and 21 is maintained by the angle members 26 (Figs. 3 and 7).

A plurality of panels such as the plates 28 are held in an erect position at intervals along the channel 21 by the flange of a corresponding channel 30 which rests upon the top flange of the channel 20. Upon the opposite side of the frame at either end of each of the plates 28 are two smaller plates 32 and 34 which are held erect on the channel 21 by angle members 36 and 38 respectively. Bolted to the inner surfaces of the plates 28, 32 and 34 are strips 40, 42 (Fig. 8) and 44 (Fig. 7) whereupon are carried the tips of the flanges two angle members 46 and 48 respectively so that the other flanges of the members are disposed in parallel relationship to each other. Fastened to the top of the angle members 46 and 48 are two strips 50 of cold rolled steel which acts as a track along which the inner soles are moved by a V-belt 52, as will be described in detail hereinafter.

The V-belt 52 is carried in a plurality of sheaves 54 spaced along the track formed by the strips 50. Each sheave 54 is journaled upon one end of an arm 56 (Fig. 3) whose other end is pivotally attached to an angle member 58 which is fastened to the plates 32. Below each of the sheaves 54 is a respective roll 60 which is carried on a shaft 62 (Fig. 6) which is journaled in the angle members 46 and 48 so that the roll extends upwardly between the vertical flanges of the angle members to contact the outer surface of the V-belt 52 as the belt passes over the bottom of the sheaves 54. At the front end of the machine the V-belt 52 passes from the top of the sheaves 54, thence under an idler sheave 66 (Fig. 3), thence about a large idler sheave 64, and thence over the top of sheaves 54 to the front end of the machine. At the rear end of the machine, the V-belt 52 passes around a driven sheave 70 (Fig. 2), thence under an idler sheave 68 and back over the sheaves 54. The drive for the sheave 70 consists of an electric motor 72 which is connected to the input shaft of a speed reduction unit 74 by means of a belt 76. The output shaft of the speed reduction unit 74 drives a sprocket fastened to the same shaft as the idler sheave 70 by means of a chain 76.

Figure 9:
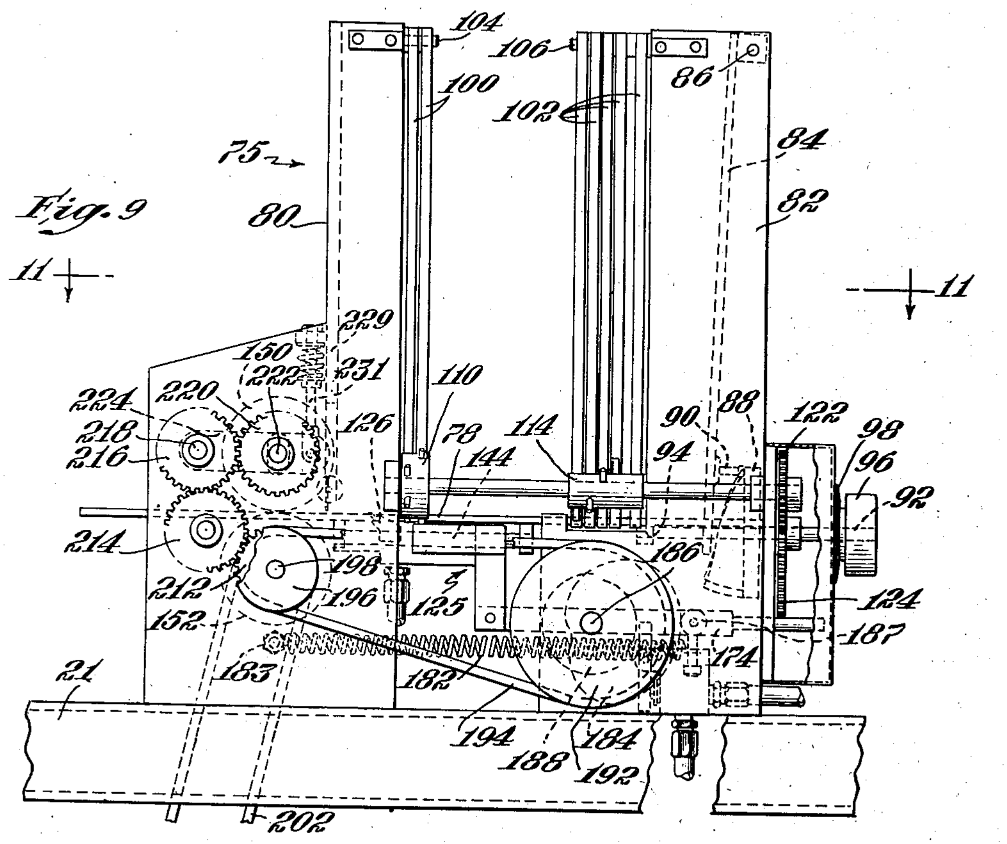
Fig. 9 is a side elevation view of the magazine.
Figure 10:
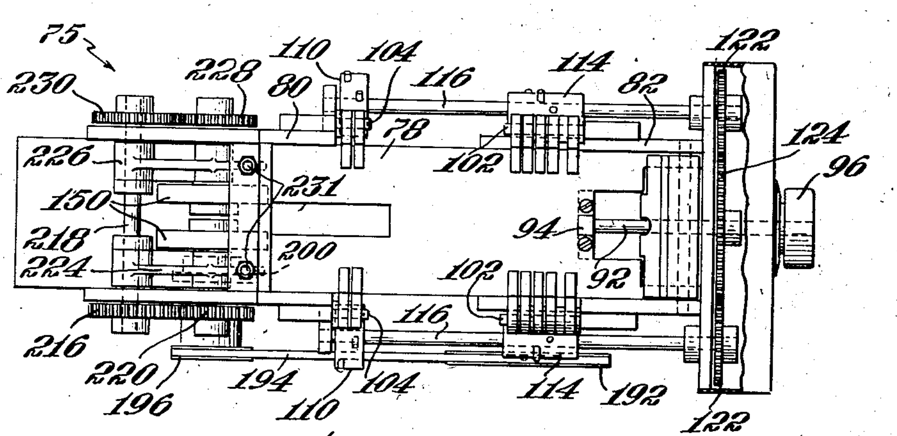
Fig. 10 is a plan view of the magazine.
Figures 11, 12:
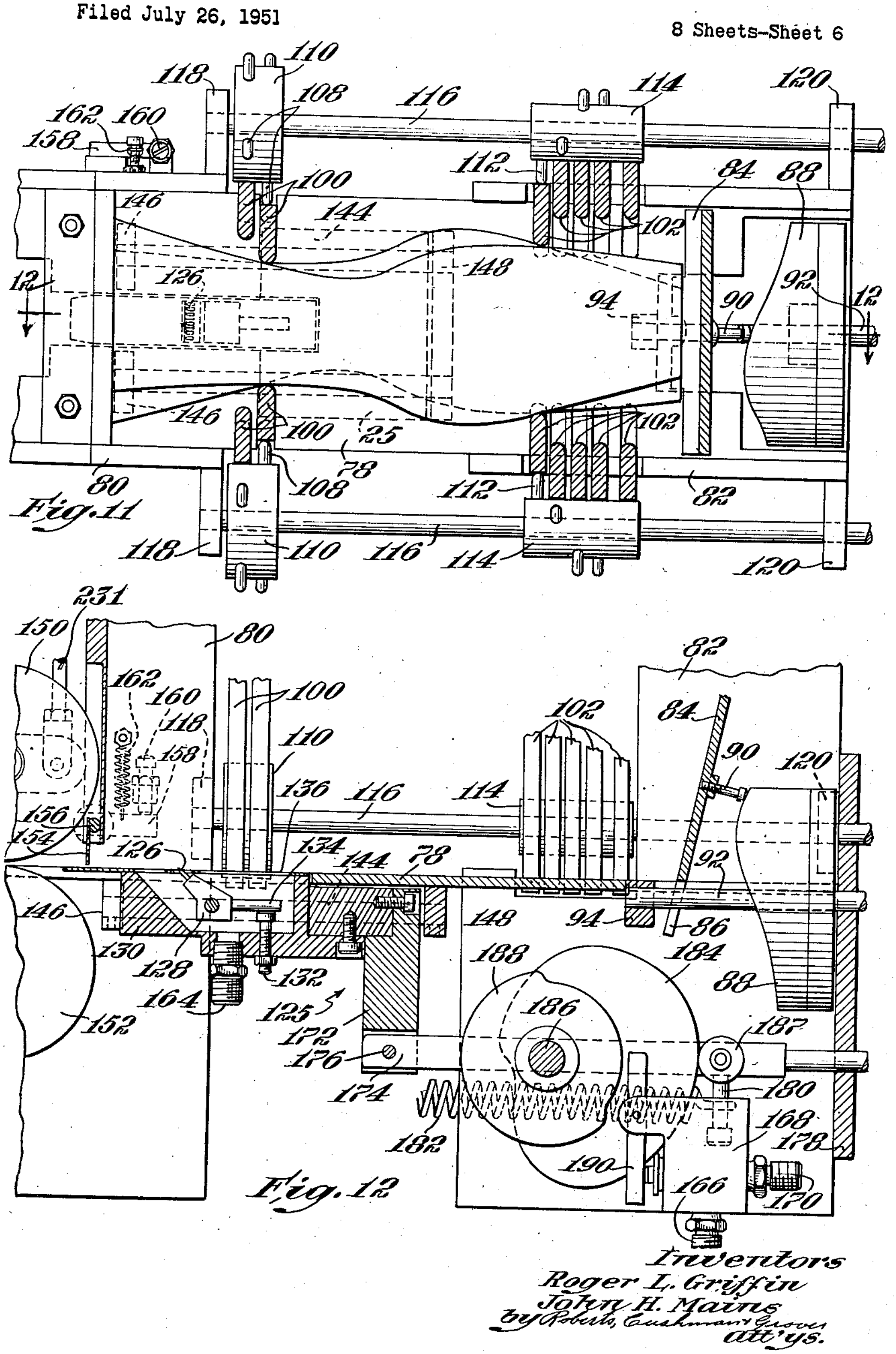
Fig. 11 is an enlarged sectional view on line 11—11 of Fig. 9.
Fig. 12 is a sectional view on line 12—12 of Fig. 11.

The inner soles are successively fed between the track strips 50 and the V-belt 52 by means of a magazine 75 such as is shown in Figs. 9 and 10. The magazine 75 comprises a bed plate 78 whereupon are stacked the inner soles between two channel shaped housings 80 and 82 with the heel portions thereof abutting the vertical end wall of the housing 80 as is shown in Fig. 11. The toe portions of the soles lie adjacent an inclined panel 84 which forms a chute to guide the soles into position to be picked up by the ejector mechanism as will be described below. The upper end of the panel 84 is pivotally attached as at 86 to the side walls of the housing 82. The lower end of the panel 84 has a tongue 86 (Fig. 12) which extends through an opening in the bed plate 78. The position of the panel 84 is adjustable to accommodate soles of various lengths by means of a cylindrical cam 88 whose cammed end surface bears against the head of a cap screw 90 extending from the back of the panel. The cam 88 is carried upon a shaft 92 one end of which is journaled in a boss 94 beneath the bed plate 78. The other end of the shaft 92 is journaled in the end wall of the housing 82. The latter shaft end has fastened thereto a cam operating knob 96 (Fig. 9) and a calibrated dial 98 for indicating the setting of the cam for various sole sizes.

As both the width and length of different size soles vary, it is necessary that the upright members 100 and 102, which are located on either side of the magazine which provide lateral support for the stack of soles at points near the heel and toe, are also made adjustable. To this end the upper ends of the members 100 and 102 are pivotally attached to pins 104 and 106 which extend horizontally from the side walls of the housing 80 and 82 respectively. The lower end of the opposed upright members 100, which bear against the sides of the heel portions of the stack of soles, are selectively held in position by means of pins 108 radially projecting from respective drums 110. The upright members 102 are similarly positioned by pins 112 extending from drums 114.

A shaft 116 is journaled upon either side of the magazine in bearing brackets 118 and 120 which extend from the housings 80 and 82 respectively. Each of the shafts 116 has fastened thereto one of the drums 110 and 114 and is rotated by means of a gear 122 (Fig. 10) which engages a gear 124 fastened to the shaft 92 so that rotating the knob 96 simultaneously adjusts the positions of upright members 100 and 102 and the panel 84 to accommodate innersoles of any selected size. As is shown in Fig. 11, both right and left hand soles of any selected size can be stacked interchangeably in the magazine 75, the upright members 100 and 102 being spaced and arranged so as to contact the sides of the soles at points where the width of both the right and left hand soles is the same.

Figure 13:
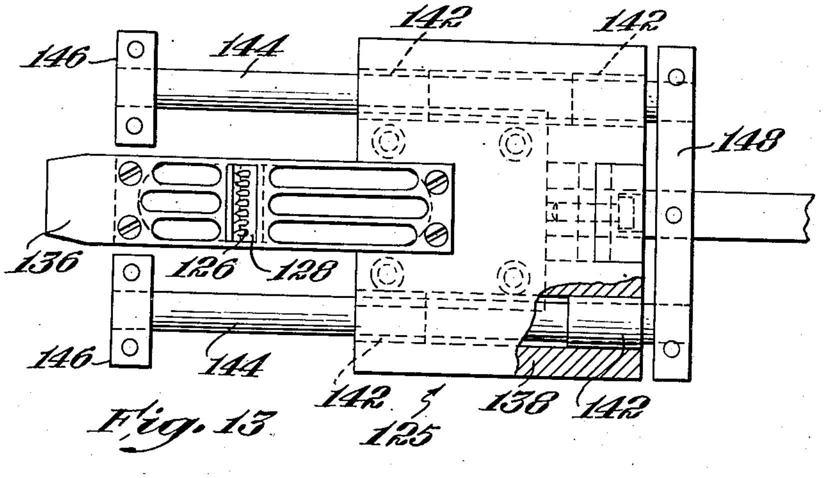
Fig. 13 is an enlarged fragmentary view showing the details of the magazine carriage.
Figure 14:
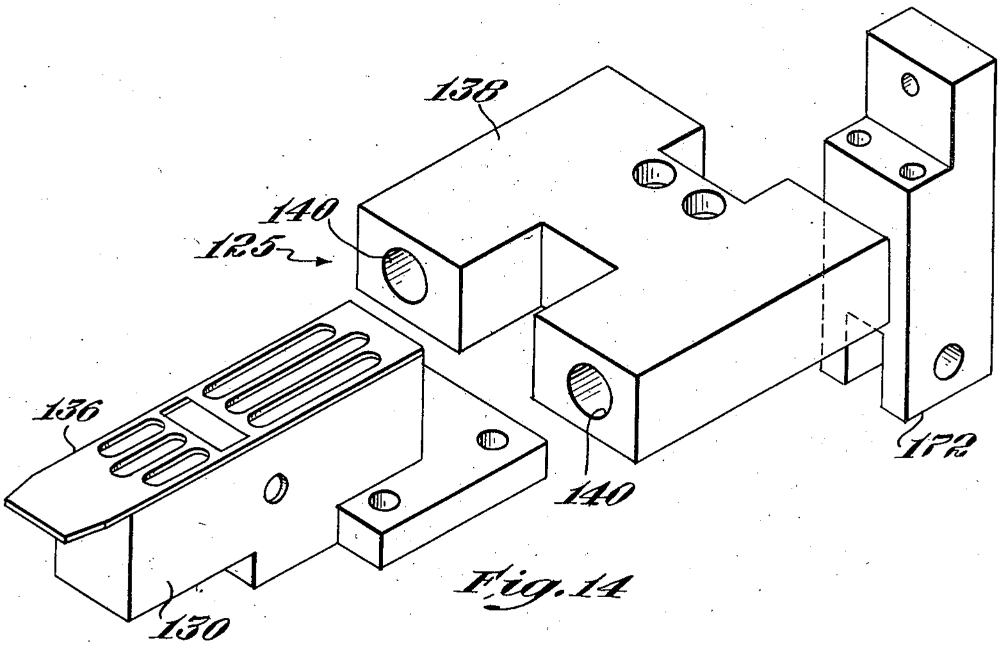
Fig. 14 is an exploded isometric view of the carriage.

The bottommost sole in the stack in the magazine 75 is pushed forward by means of projections such as the stylus 126 (Fig. 13) which extends upwardly through a slotted aperture in the magazine bed plate 78 from a carriage 125 which is reciprocally driven as will be described in detail hereinafter. The stylus 126 are mounted in row transverse to the direction of movement of the carriage 125 in a holder 128 (Fig. 12) which is pivotally mounted in a cavity in the front portion 130 of the carriage 125 in a holder 128 (Fig. 12) which is pivotally mounted in a cavity in the front portion 130 of the carriage 125. Clockwise movement of the holder 128 (as viewed in Fig. 12) is limited by the head of a cap screw 132 which acts as a stop to engage a pin 134 extending from the holder so that the stylus 126 projects through a transverse opening in a cover plate 136 (Fig. 13) for the top of the carriage front portion 130. As is best shown in Fig. 14, the front portion 130 is bolted to an H-shaped member 138 whose opposed arms are provided with apertures 140 wherein are pressed bushings 142 (Fig. 13). The bushings 142 slidably engage two rods 144 which are suspended below the bed plate 78 by means of brackets 145 and 148 so that the carriage 125 is movable with respect to the remainder of the magazine 75. Upon the working portion of the stroke (i. e. towards the left as viewed in Fig. 12), the stylus 126 are held in the inclined position shown by the stop 132 so that they engage the under surface of the bottommost sole of the stack thereby to move the sole between two pairs of driven rolls 150 and 152. To prevent the possible ejection of more than one sole at a time a gate 154 is provided which gate is secured to a shaft 156 journaled in the side walls of the housing 80. The shaft 156 has secured to one end thereof an arm 158 which is biased against a stop screw 160 by a spring 162 so that the gate 154 is yieldably held with its lower edge in position to permit only the bottommost sole to pass. Upon the return stroke of the carriage 125, the holder 128 pivots counterclockwise (as viewed in Fig. 12) so that the stylus are retracted below the surface of the cover plate 136.

The weight of the stack forces the bottommost sole into engagement with the stylus 126, but to make certain that there is no slippage therebetween when only a few soles are in the stack, suction means are provided to force the bottommost sole into engagement with the stylus. To this end the cover plate 136 for the front portion 130 of the carriage 125 is provided with a plurality of longitudinally disposed openings (see Figs. 13 and 14) and a vacuum created in the cavity thereunder by connecting a fitting 164 (Fig. 12) in the bottom of the front portion with a similar fitting 166 in a valve 168 by means of a flexible hose (not shown). The other valve fitting 170 is connected with a vacuum pump P (Fig. 3). The valve 168 is operated in timed relaship with respect to the movement of the carriage 125 as will be described hereinafter so that the suction is applied to the bottommost sole only during the working portion of the stroke.

Extending downwardly from the rear end of the H-shaped member 138 of the carriage 125 is an arm 172 (Fig. 14). The bottom end of the arm 172 is bifurcated to receive one end of a rod 174, the connection therebetween being made by a pin 176. The opposite end of the rod 174 slides in an aperture in an end plate 178 secured to the housing 82. Extending downwardly from the rod 174 is a bolt 180 to which is connected one end of a strong helical spring 182. As is best shown in Fig. 9, the opposite end of the spring 182 is secured to the wall of the lower portion of the housing 80 as at 183 so that the carriage 125 is moved forwardly upon its working stroke by the force exerted by the spring. The return stroke of the carriage 125 against the biasing force exerted by the spring 182 is accomplished by means of a cam 184 which bears against a follower 187 mounted on the side of the rod 174. The cam 184 is mounted upon the end of a shaft 186, which also carries a second cam 188 for periodically operating the air valve 168 through a lever 190, and a driven sprocket 192 (Fig. 9) for a chain 194. The opposite end of the chain 194 passes around a smaller sprocket 196 carried upon a shaft 198 which also carries a sprocket wheel 200 (Fig. 10) for a driving chain 202. The opposite end of the chain 202 is driven by a second sprocket wheel 204 (Fig. 3) on the output shaft of a speed reduction unit 206 which together with the vacuum pump P and a common driving motor 208 is mounted upon a pair of angle members 210 extending between the legs 22 at the front end of the machine.

The shaft 198 in addition to the sprocket 200 also carries the two bottom rolls 152 and a gear 212 (Fig. 9) which mates with an idler gear 214. The gear 214 engages a gear 216 carried upon a shaft 218 which latter gear engages a gear 220 mounted upon on end of a stub shaft 222 extending through a slotted aperture in the side wall of the housing 80. The shaft 222 is journaled in a bearing in the end of an arm 224 whose other end is pivotally mounted upon the shaft 218. The opposite end of the stub shaft 222 carries one of the rolls 150. The second roll 150 is carried upon a similar stub shaft which is journaled in the end of an arm 226 (Fig. 10) and has secured to its opposite end a gear 228. The gear 228 mates with a gear 230 upon the shaft 218 thereby to drive the second roll 150. As the gears 212, 214, 216, 220, 228 and 230 are of the same size, both pair of upper and lower rolls 150 and 152 are driven at the same speed. The pivotal movement of the arms 224 and 226 about the shaft 218 permits the raising of the upper rolls 150 against the force exerted by springs 229 acting through the push rods 231 which are pivotally attached to the ends of the arms 224 and 226 respectively, thereby to accommodate soles of different thicknesses without interfering with the driving thereof.

After the stylus 126 have delivered the bottommost sole in the magazine 125 to the rolls 150 and 152 as has been described heretofore, these rolls advance the sole so that it is inserted between the track strips 50 and the portion of the V-belt 52 adjacent the bottom of the sheave 64 (Fig. 3). As the friction exerted by the cold rolled track strips 50 upon the bottom of the sole is much less than the friction exerted upon the top of the sole by the V-belt 52, the belt acts as a conveyor carrying the sole along with it through the successive grading stations.

Figure 6:
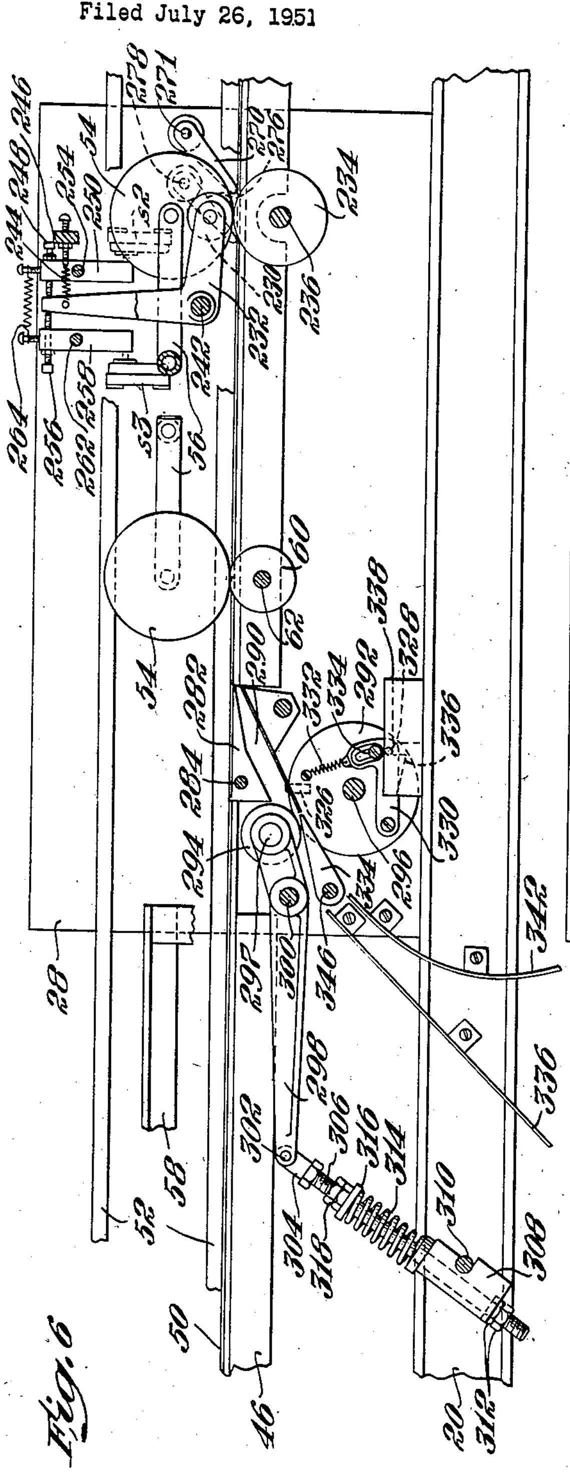
Fig. 6 is an enlarged sectional view on line 6—6 of Fig. 6.

As all the grading stations are identical in construction and operation, differing only in their settings, only one of the stations will be described in detail. The grading at each station is done by two grading rolls 230 which traverse parallel lines near the outer edge of the sole as it passes through the station. As is best shown in Fig. 6, each grading roll 230 is rotatably mounted upon one end of a respective bell crank 232 which bell cranks are positioned upon either side of the particular sheave 54 located at the station. The track strips 50 and the angle members 46 are cut away to accommodate an idler roll 234 which is journaled upon a shaft 236 extending between the side plates 28 and 32 so that the roll is located immediately below the grading rolls 230. The shaft 236 is stationary and the portion carrying the roll 234 is eccentric with respect to the remainder of the shaft whereby the shaft may be manually turned by means of a sleeve 238 (Fig. 7) keyed thereto to permit a quick yet fine adjustment in the thickness setting. The shaft 236 is locked in adjusted position by means of a nut 240.

The bell cranks 232 are pivotally mounted upon a shaft 242 (Fig. 6) which extends between the side plates 28 and 32. Each bell crank 232 is individually biased by means of a respective spring 244, which extends between the vertical arm of the bell crank to a bridge 246 spanning the distance between the side plates 28 and 32 so that the grading rolls 230 are urged against the idler roll 234. In this position of the grading rolls 230 the ends of the vertical arms of the respective bell cranks 232 are in forcible contact with two adjustable pins such as the cap screws 248 each of which is threaded in an aperture in the upper end of correlated pivoted members 250 and 252 (Fig. 7) which are both fastened to a shaft 254 journaled in the side plates 28 and 32 so that the members move conjointly. Located upon the opposite side of the vertical arms of the bell cranks 232 from the cap screws 248 are two similar cap screws 256 (Fig. 8) which engage threaded apertures in two pivotal members 258 and 260 respectively. The members 258 and 260 are generally similar to the members 250 and 252 and are fastened in an analogous manner to a shaft 262 journaled in the plates 28 and 32.

A spring 264 (Fig. 6) interconnects the top ends of the pivotal members 250 and 258. It will be evident that the spring 264 will bring the upper ends of the pivotal members 250 and 258 so that the lower ends thereof contact the actuators of two switches *s*3 and *s*2 which are mounted upon the plate 28 thereby to maintain the normally closed contacts of the switches transferred to the open position. In the absence of a sole in the station, the springs 244 (Fig. 6) bias the bell crank 232 so that the grading rolls 230 are brought against the idler roll 234 in which positions the vertical arms of the bell cranks contact the cap screws 248 overcoming the force exerted by the spring 264 so that the lower end of the pivotal member 250 does not actuate the switch *s*2 to maintain its contacts in an open position. The transferring of the contacts of the switch *s*2 back to a closed position takes place when either of the grading rolls 230 falls below a predetermined minimum thickness setting which is determined by the adjustment of the cap screws 248. Similarly the raising of either of the grading rolls 230 above a predetermined maximum thickness setting position determined by the adjustment of screws 256 transfers the contacts of the switch *s*3 to a closed position.

Figure 4:
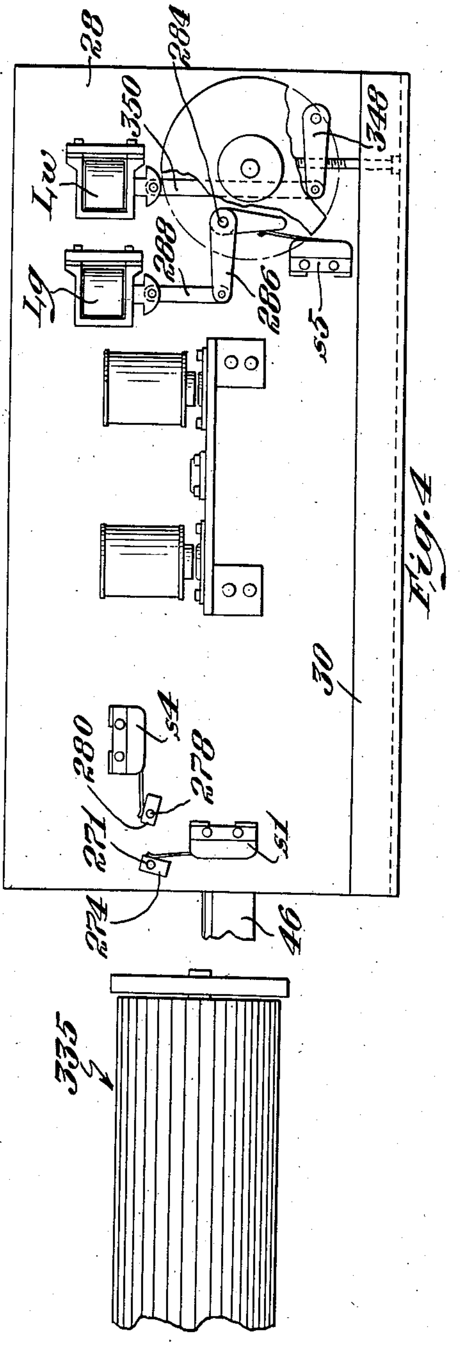
Fig. 4 is a fragmentary side elevation view of the panel for the electrical components of one of the grading stations.

Two switches *s*1 and *s*4 are mounted upon the outer face of the side plate 28 as is shown in Figure 4. The switch *s*1 is a resetting switch and is operated by a finger 270 whose end rests upon the track strip 50 in front of the right hand grading roll 230, as is shown in Fig. 6. The opposite end of the finger 270 is fastened to a shaft 271 journaled in a boss 272 (Fig. 7) extending from the inner wall of the plate 28 so that the finger is pivoted, rotating the shaft by the heel portion of a sole entering the grading station. The shaft 271 extends through the plate 28 and has fastened to its outer end a block 274 which contacts the actuator of the switch *s*1. The block 274 is relatively positioned upon the shaft 271 so that the contacts of the switch *s*1 are held in the transferred position when the end of the finger 270 is resting upon the track strips 50, the block moving to permit the switch contacts to return to their normal position when the finger is raised by a sole entering the station.

A similar finger 276 is positioned behind the grading roll 230 to operate the switch *s*4 thereby to act as detecting means for determining the presence of a sole in the station as will be described in detail hereinafter. The finger 276 is carried upon a shaft 278 which moves a block 280 to transfer the contacts of the switch *s*4 when the finger is lifted by a sole.

Figure 5:
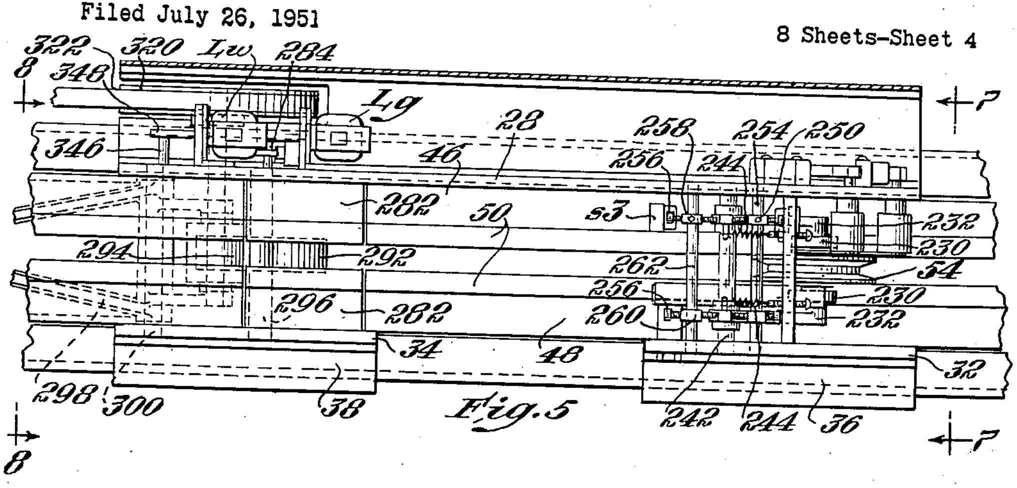
Fig. 5 is a plan view of one of the grading stations.

As is best shown in Fig. 6, a gate consisting of two essentially triangular members 282 mounted upon a shaft 284 journaled in the plates 28 and 32 which can be rotated, as will be described below, to raise the triangular members so that they intercept the path of a sole as it travels along the track strips 50. As can be best seen in Fig. 5 the top surfaces of the gate members 282 are the same width as the strips 50 and when the gate is closed form a part of the track along which the soles are conveyed by the V-belt 52. The under surfaces of the gate members 282 are cambered so as to divert a sole downwardly from its path when the gate is raised to its open position. The gate shaft 284 has attached to its outer end a bell crank 286 (Fig. 4) one of whose arms is connected to the armature of an electromagnet L*g* by means of a link 288. The other arm of the bell crank 286 operates the actuator of an interlocking switch *s*5 to close the normally open contacts of the switch when the gate is in the open position.

A sole diverted by the opening of the gate member 282, as described above, is guided by the aid of a guide member 290 between a stamping roll 292 (Fig. 6) and its associated driving roll 294. The stamping roll 292 is fastened upon a shaft 296 whose ends are journaled to the side plates 28 and 32. The driving roll 294 is carried by a shaft 297 journaled in a V-shaped bracket forming the short arm of a bell crank 298 which is pivotally mounted upon a shaft 300. The long arm of the bell crank 298 carries a pin 302 which pivotally secures a thimble 304 wherein is threaded in one end a rod 306. The other end of the rod 306 extends through an aperture in a hanger 308 which is pivotally mounted upon a shaft 310 secured to the channel members 20 and 21. Locknuts 312 threadingly engaging the lower end of the rod 306 to bear against the hanger 308 thus determining clearance between the stamping roll 292 and the driving roll 294. A strong spring 314 is interposed between the top of the hanger 308 and a washer 316 backed up by nuts 318 upon the rod 306 so that the spring force opposes the separation of the driving and stamping rolls as a sole passes therebetween. The driving roll shaft 297 extends through an aperture in the plate 28 and has secured thereto a pulley 320 which is driven by means of a belt 322 from a motor 324 which is suspended beneath the channel members 20 as is shown in Fig. 3.

The periphery of the stamping roll 292 is knurled so as a sole passes between the driving roll 294 and the stamping roll, the latter roll revolves to bring a die 326 into engagement with the surface of the sole. The die 326, which is removable, is radially inserted in the stamping roll 292 with its end raised above the periphery of the roll. The die bears a legend, for example a digit indicating in irons (1/48 of an inch) or other suitable units, the thickness of the sole diverted by the station. To insure that the die 326 stamps all the soles in substantially the same location, the roll 292 is restrained by a pin 328 which extends from the side of a latch member 330. The latch member is pivotally attached to the side of the stamping roll 292 and is biased towards the center of the roll by means of a spring 332, the travel of the latch member being limited by a slotted aperture which engages a pin such as the screw 334. The latch pin 328 engages a detent 336 in a block 338 secured to the side plate 34 thereby to limit the clockwise rotation (as viewed in Fig. 6) of the stamping roll 292 due to the force exerted by the unbalanced weight of the latch member 330 so that the roll always comes to rest with the die 326 in the vertical position. As the stamping roll 292 is rotated in a counterclockwise direction by a sole, the latch pin 328 is lifted from the detent 336 as the roll starts to revolve near the end of one complete revolution the latch pin 328 rides up the ramp of the detent 336 thereby to stretch the spring 332 which spring snaps the latch mmeber 330 back as the pin falls off the end of the detent ramp.

Figure 1:
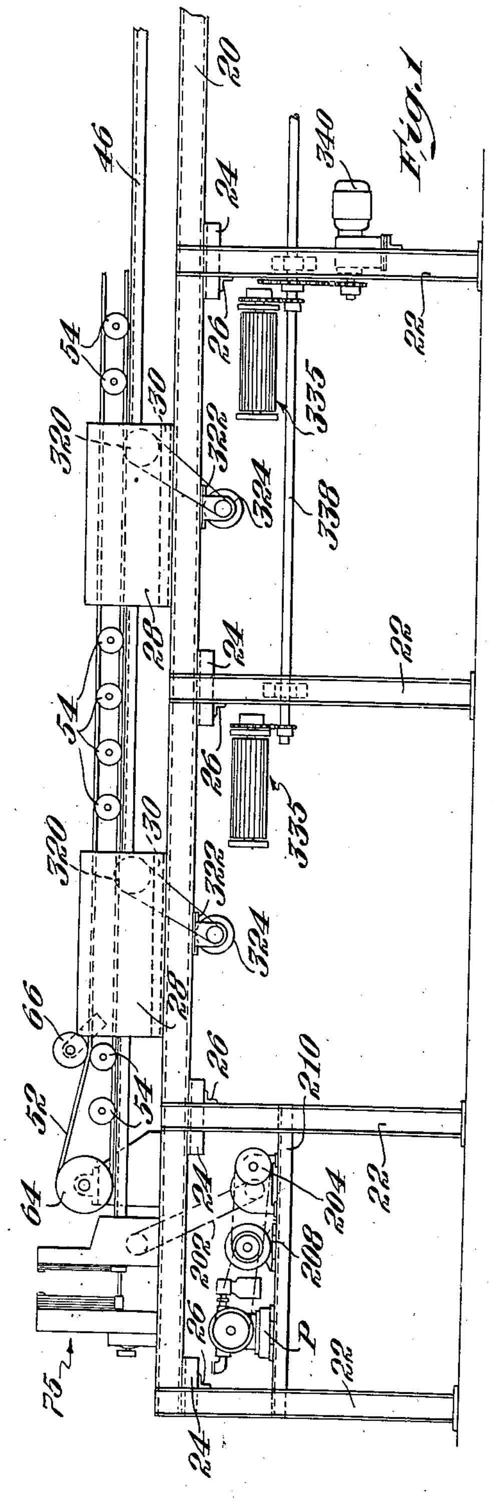
Fig. 1 is a side elevation view of the front end of the specific embodiment.
Figure 2:
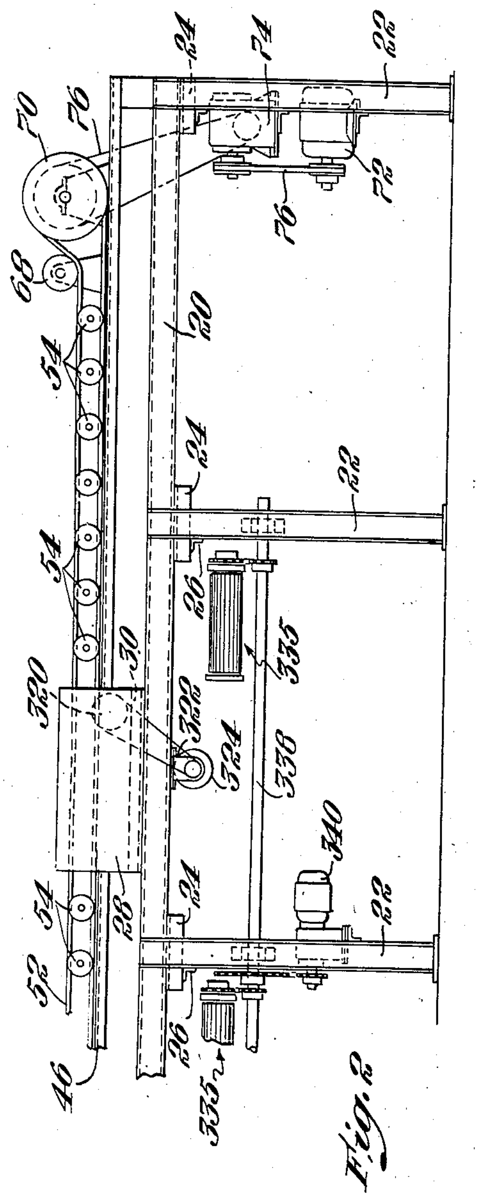
Fig. 2 is a side elevation view of the rear end of the same embodiment.

After passing between the stamping and driving rolls, a normal sole passes over a wedgie gate 334 whose function will be described hereinafter, and down a guide 336 to a conveyor 335. As best shown in Figs. 1 and 2, the conveyors 335 for several adjacent grading stations are driven by chains from a common shaft 338 turned by a speed reducer motor 340.

If the sole diverted by the grading station is a wedgie, i. e., the difference between its maximum and minimum thickness exceeds a predetermined amount, the wedgie gate 334 is lifted to an open position, as will be described below, in which open position, a sole emerging from between the stamping and driving rolls is diverted downwardly beneath a concave guide 342 (Fig. 6) into a bin (not shown). To this end the wedgie gate 334 consists of two fingers 344 (Fig. 8) which are attached to a shaft 346 journaled in the side plates 28 and 32 so that the fingers straddle the stamping roll 292. One end of the shaft 346, which extends through the plate 28, has attached thereto an arm 348. The end of the arm 348 is connected with the armature of an electromagnet L*w* by means of a link 350 as is shown in Fig. 4.

The above described grading apparatus is entirely automatic in operation, an attendant merely being required to replenish the stack of soles in the magazine 75. The magazine 75 is readily adapted to receive a stack of soles of a different size by rotation of the knob 96, as has been described heretofore, appropriate indicia corresponding to the various sole sizes being marked on the dial 98 so that an exact adjustment can be readily made. As has been described in detail heretofore, the stylus 126 pivotally mounted on the top of the reciprocating carriage 125 successively ejects the bottommost sole in the stack so that such sole is forwarded by the rolls 150 and 152 to the conveyor belt 52. The belt 52 moves the soles along the track strips 50 to the first grading station whose grading rolls 230 are set to close the switch *s2* whenever the distance between either of the grading rolls and the associated idler roll 234 is less than 2 iron (i. e. $\frac{2}{48}$ of an inch).

Figure 15:
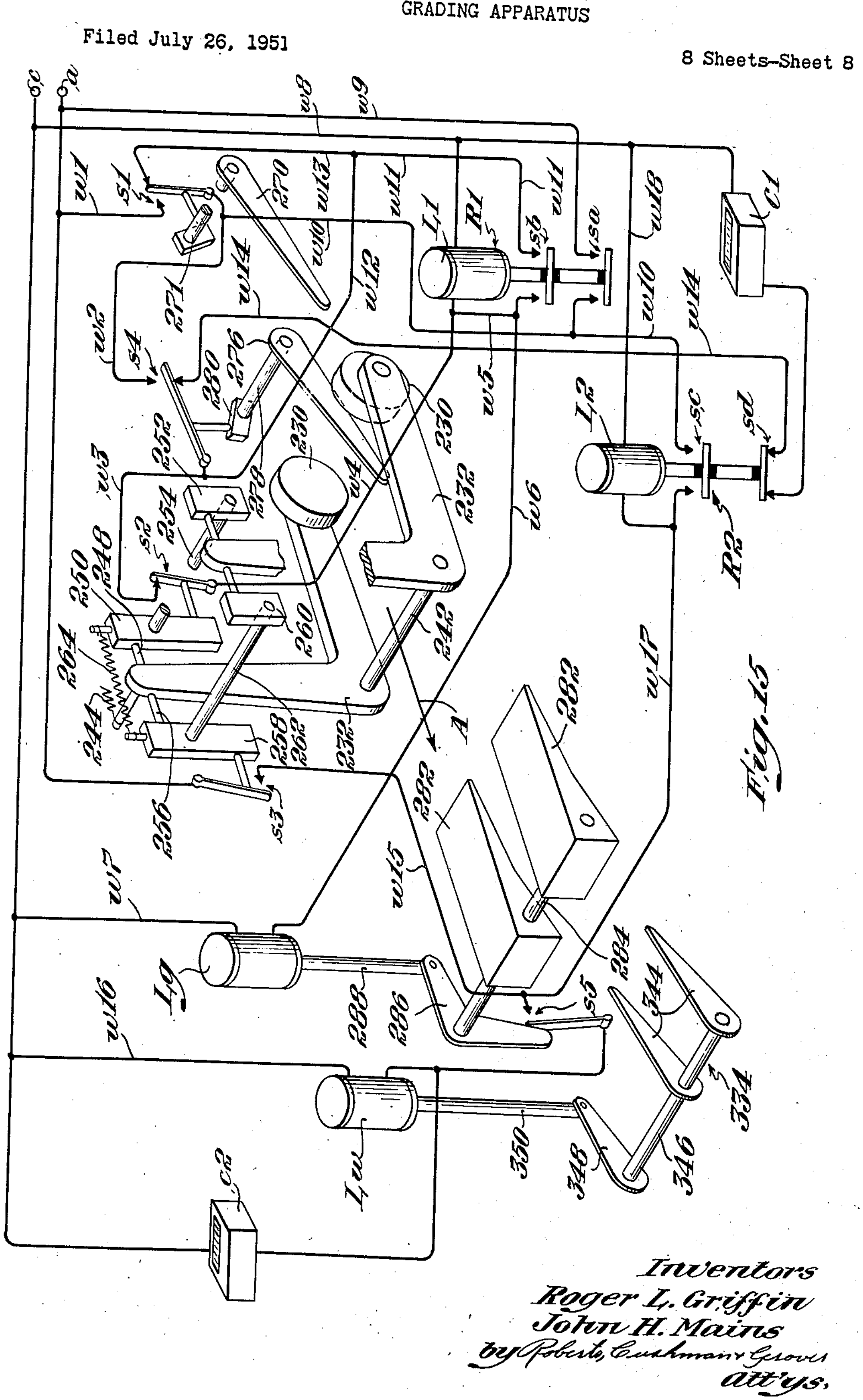
Fig. 15 is a schematic diagram of one of the grading stations showing the electrical connections.

The action of the various elements of the station can best be understood by reference to the schematic diagram of Fig. 15 wherein the large arrow A indicates the travel of the sole through the station. During such travel a sole, which has a minimum thickness of less than 1½ iron, sequentially: (1) lifts the finger 270 to transfer the contacts of the switch *s1*, (2) permits either or both of the grading rolls 230 to fall below the minimum setting of the station, and (3) lifts the finger 276 to transfer the contacts of the switch *s4*. Upon the completion of the three above operations a circuit is completed energizing the gate solenoid L*g* from the terminals *a* and *c* of a conventional power source (not shown) which circuit includes the terminal *a*, a conductor *w1*, the switch *s1*, a conductor *w2*, the switch *s4*, a conductor *w3*, the switch *s2*, conductors *w4*, *w5* and *w6*, the gate solenoid L*g* and a conductor *w7* to the terminal *c*. The solenoid L1 of a holding relay R1 is connected in parallel with the gate solenoid L*g* by a conductor *w8* so that the two solenoids are energized simultaneously. The energization of the solenoid L1 closes the normally open contacts *sa* and *sb* of the relay R1. The closing of the contacts *sa* completes a circuit including a conductor *w9*, the relay contacts and a conductor *w10* which parallels the contacts of the switch *s1*. The closing of contacts *sb* and *sa* completes a holding circuit including from terminal *a*, the conductor *w9*, contacts *sa*, conductor *w10*, conductor *w2*, the switch *s4*, conductor *w12*, conductor *w11*, the switch contacts *sb*, conductor *w5*, the coil of L1, conductor *w8*, and the terminal *c* so that opening of the switch contacts upon the raising of one of the grading rolls by a subsequent high spot in the sole does not deenergize the gate solenoid L*g*. The gate solenoid L*g* remains energized, after the switches *s1* and *s4* have transferred back to their original positions due to the travel of the sole beyond the fingers 270 and 276, by means of a circuit including the terminal *a*, the conductor *w9*, the holding relay contacts *sa*, conductor *w10*, the contacts of the switch *s1* which are closed by the finger 270 in the absence of a sole, conductors *w13* and *w11*, the holding relay contacts *sb*, the conductor *w6*, the gate solenoid L*g* and the conductor *w7* to the terminal *c*. A counter C1 is energized by the closing of the contacts of the switch *s4* by the dropping of the finger 276, after the sole has passed, to complete a circuit including the terminal *c*, the conductor *w8*, the counter C1, the normally closed contacts *sd* of a relay R2, whose function will be described below, a conductor *w14*, the switch *s4*, the conductors *w12* and *w13*, the switch *s1*, the conductor *w10*, the holding relay contacts *sa* and the conductor *w9* to the terminal *a*.

Inasmuch as the gate solenoid L*g* is energized by the above described circuits, the gate members 282 are lifted so that the sole is diverted downwardly through the stamping roll 292, which stamps the legend corresponding to the thickness graded by the station, and thence to the conveyor 335 as has been described in detail heretofore. The gate solenoid L*g* is deenergized to close the gate by the following sole upon the conveyor entering the station to lift the finger 270 so that the contacts of the switch *s1* breaking the circuit energizing the gate solenoid through the relay contacts *sa* and *sb* as described above.

If the thickness of the sole diverted by the station is more than a predetermined amount greater than the minimum thickness, the sole is a so called "wedgie" and one or both of the grading rolls 230 rise sufficiently so that the corresponding bell crank 232 causes the lever 258 to release the actuator of the switch *s3* closing the switch contacts. Upon the making of the contacts of the switch *s3*, the solenoid L2 of the relay R2 is energized by means of a circuit including the terminal *a*, the switch *s3*, the conductors *w15* and *w17*, the solenoid L2, and the conductors *w18* and *w8* to the terminal *c*. The making of the contacts of the switch *s3* energizes the solenoid L*g* as has been described heretofore, this contact to be made in switch *s5* through the actuation of bell crank 286. The wedgie gate solenoid L*w* is energized by a circuit including the terminal *a*, the switch *s3*, a conductor *w15*, the interlocking switch *s5*, which is closed by the opening of the track gate members 282, the solenoid and a conductor *w16* to the terminal *c*. A wedgie counter connected in parallel with the solenoid L*w* is also energized by the completion of the above circuit. The operation of the relay R2 opens the contacts *sd* so that the counter *c1* is not operated by the closing of the switch *s4* as was described in detail heretofore in connection with the passing of a regular sole through the station. The conjoint closing of the normally open relay contacts *sc* completes a holding circuit paralleling the switch *s3* so that the subsequent opening of the switch does not deenergize the relay solenoid L2 and the wedgie gate solenoid L*w*. This holding circuit includes from the terminal *c*, conductor *w8*, conductor *w18*, the coil of L2, contacts *sc*, conductor *w10*, contacts *sa*, conductor *w9* and the terminal *a*.

If the sole passing through the first grading station has a minimum thickness greater than the 1½ iron setting of the grading rolls 230, the rolls do not drop far enough to permit the contacts of the switch *s2* to close so that the circuit energizing the gate solenoid L*g* is not completed. As the gate 282 is not opened, the sole passes over the top of the gate to continue through the succeeding stations until a station is reached which has a setting such as to trip the switch *s2* operated by the grading rolls whereupon the sole is diverted in a manner similar to that described in detail above in connection with the first station. As has been mentioned heretofore the energization of the gate solenoid L*g* is possible only when the contacts of the switches *s1*, *s2*, and *s4* are all closed. It will be evident that during the passing of a sole through a grading station, the finger 270 will drop off the sole first making the gauging circuit inoperative so that the subsequent dropping off of the sole of the rolls 230 does not result in a false indication.

It should be understood that the present disclosure is for the purpose of illustration only and that this invention includes all modifications and equivalents which fall within the scope of the appended claims.

We claim:

1. Apparatus for grading sheet material comprising means for feeding a sheet along a predetermined path; and a grading station including a gate positioned in the path and having an operating solenoid for opening the gate to divert the sheet from the path, a control circuit including a power supply for operating the gate, said circuit having two switches connected in series with said power supply and said solenoid, a holding relay having normally open contacts connected in parallel with the first switch and a coil for transferring the contacts connected in parallel with the gate solenoid, gauging means for closing the first of said switches when the thickness of the sheet is less than a predetermined setting thereby to operate the gate and energize the relay when the second switch is closed, and detecting means including a trip member located in said path at said station, said trip member being operated by the sheet to close the second switch thereby preventing the operation of the gate upon the closing of the first switch in the absence of a sheet at the station.

2. Apparatus for grading sheet material comprising means for feeding a sheet along a predetermined path; and a grading station including a gate positioned in the path and having an operating solenoid for opening the gate to divert the sheet from the path, a control circuit including a power supply for operating the gate, said circuit having three switches connected in series with said power supply and said solenoid, a holding relay having two pair of normally open contacts and a coil for transferring the contacts connected in parallel with the gate solenoid, the first pair of contacts being connected in parallel with the first switch, the second pair of contacts being connected in parallel with the second switch, gauging means for closing the first of said switches when the thickness of the sheet is less than a predetermined setting thereby to operate the gate and conjointly to energize the relay when the second switch is closed, the first pair of relay contacts completing a holding circuit to maintain the gate open in the event of the opening of the first switch, detecting means including a first trip member located beyond the gauging means in the direction of travel of the sheet, said trip member being operated by the sheet to close the third switch thereby preventing the operation of the gate upon the closing of the first switch in the absence of a sheet at the station and a second trip member located before the gauging means in a direction opposed to the direction of travel of the sheet, said second trip member being operated by a succeeding sheet to open the second switch thereby to deenergize the solenoid thus closing the gate.

3. Apparatus for grading sheet material comprising means for feeding a sheet along a predetermined path; and a grading station including a first gate positioned in the path and having an operating solenoid for opening the gate to divert the sheet from the path, a control circuit including a power supply for operating the gate, said circuit having two switches connected in series with said power supply and said solenoid, a holding relay having two pair of normally open contacts and a coil for transferring the contacts connected in parallel with the gate solenoid, the first pair of contacts being connected in parallel with the first switch, gauging means for closing the first of said switches when the thickness of the sheet is less than a predetermined setting thereby to operate the gate and conjointly to energize the relay when the second switch is closed, the first pair of relay contacts completing a holding circuit to maintain the gate open upon the subsequent opening of the first switch, detecting means including a trip member located beyond the gauging means in the direction of travel of the sheet, said trip member being operated by the sheet to close the second switch thereby preventing the operation of the gate upon the closing of the first switch in the absence of a sheet at the station, a second gate having an operating solenoid for opening the gate, said second gate being located when in the open position to intercept sheets diverted by the opening of the first gate, and a control circuit for energizing the second gate, which circuit includes the second pair of contacts and a switch closed by the gauging means when the thickness of the sheet is greater than a predetermined maximum setting.

4. Apparatus for grading sheet material comprising means for feeding a sheet along a predetermined path; and a grading station including a first gate positioned in the path and having an operating solenoid for opening the gate to divert the sheet from the path, a control circuit including a power supply for operating the gate, said circuit having three switches connected in series with said power supply and said solenoid, a holding relay having two pair of normally open contacts and a coil for transferring the contacts connected in parallel with the gate solenoid, the first pair of contacts being connected in parallel with the first switch, the second pair of contacts being connected in parallel with the second switch, gauging means for closing the first of said switches when the thickness of the sheet is less than a predetermined setting thereby to operate the gate and conjointly to energize the relay when the second switch is closed, the first pair of relay contacts completing a holding circuit to maintain the gate open in event of the subsequent opening of the first switch, detecting means including a first trip member located beyond the gauging means in the direction of travel of the sheet, said trip member being operated by the sheet to close the third switch thereby preventing the operation of the gate upon the closing of the first switch in the absence of a sheet at the station, and a second trip member located before the gauging means in a direction opposed to the direction of travel of the sheet, said second trip member being operated by a succeeding sheet to open the second switch thereby to deenergize the solenoid thus closing the gate, a second gate having an operating solenoid for opening the gate, said second gate being located when in the open position to intercept sheets diverted by the opening of the first gate, and a control circuit for energizing the second gate, which circuit includes the second pair of contacts and a switch closed by the gauging means when the thickness of the sheet is greater than a predetermined maximum setting.

5. Apparatus for grading sheet material comprising a conveyor including a belt for feeding a sheet along a predetermined path; and a grading station including a first gate having a finger on either side of the belt, a solenoid for rotating the fingers into the path to divert the sheet from the path, gauging means including an electrical circuit having a normally closed switch for energizing the gate solenoid, a member biased to maintain the switch in its open position, a bell crank located on either side of said belt, each of said cranks having a roller at one end thereof, the other end of said levers contacting said member when the thickness of the sheet at the station is less than a predetermined setting to permit the switch to close thereby to operate the gate to remove the sheet from the belt, detecting means for interrupting the circuit in the absence of a sheet at the station to prevent the energization of the gate solenoid, a second gate located when in the open position to intercept sheets diverted from the path by the first gate, a second solenoid for operating the second gate, and a circuit including a normally open switch for energizing the second solenoid, a member operated by either bell crank to close the normally open switch when the thickness of the sheet is greater than a predetermined maximum setting.

6. Apparatus according to claim 5, wherein an interlocking switch in the circuit of the second gate is operated by the opening of the first gate.

7. Feeding apparatus for sheet material comprising a magazine for holding a stack of sheets, ejecting means at one end of said magazine including projections for engaging the surface of the endmost sheet in the stack and suction means for drawing the sheet against the projections, means at said end having a forward stroke for reciprocating the projections transversely of the magazine in a direction substantially parallel to the plane of the sheet and return stroke, said projections being pivotally mounted so that they retract upon the return stroke whereby the sheet is removed from the end of the stack, and gate means adjacent said end of the magazine and spaced lengthwise therefrom for restraining the movement of all except the endmost sheet.

8. Feeding apparatus for sheet material comprising a magazine for holding a stack of sheets, ejecting means including a carriage slidably mounted below the magazine and having a cavity wherein are pivotally mounted a plurality of stylus in a row transverse to the direction of movement of the carriage so that the stylus engage the lower surface of the bottommost sheet in the stack, said cavity being arranged to be connected to a vacuum pump to draw the sheet against the stylus, means for reciprocating the carriage so that the stylus move the bottommost sheet in a direction substantially parallel to the plane of the sheet, the stylus retracting upon the return stroke whereby the sheet is removed from the bottom of the stack, and a gate for restraining the movement of all except the bottommost sheet.

9. Feeding apparatus for sheet material comprising a magazine including an apertured base plate for holding a stack of sheets and a plurality of upright members pivotally supported at their upper ends and located on either side of the base plate, backing means for said members so that the members provide lateral support for the stack, said backing means being adjustable to vary the position of the members so that the magazine can accommodate sheets of various widths, ejecting means including projections extending through the base plate aperture for engaging the lower surface of the bottommost sheet in the stack and suction means for drawing the sheet against the projections, means for reciprocating the projections to move the sheet along the base plate between the opposed upright members whereby the sheet is removed from the bottom of the stack, and a gate for restraining the movement of all except the bottommost sheet.

10. Feeding apparatus for sheet material comprising a magazine including an apertured base plate for holding a stack of sheets and a plurality of upright members pivotally supported at their upper ends and located on either side of the base plate, two conjointly rotatable members having pins for selectively engaging opposed upright members to provide lateral support for the stack, ejecting means including projections extending through the base plate aperture for engaging the lower surface of the bottommost sheet in the stack and suction means for drawing the sheet against the projections, means for reciprocating the projections to move the sheet along the base plate between the opposed upright members whereby the sheet is removed from the bottom of the stack, and a gate for restraining the movement of all except the bottommost sheet.

11. Feeding apparatus for sheet material comprising a magazine including an apertured base plate for holding a stack of sheets and a plurality of upright members pivotally supported at their upper ends and located on either side of the base plate, two conjointly rotatable members having pins for selectively engaging opposed upright members to provide lateral support for the stack, an adjustable stop located at one end of said base plate, ejecting means including projections extending through the base plate aperture for engaging the lower surface of the bottommost sheet in the stack and suction means for drawing the sheet against the projections, means for reciprocating the projections to move the sheet along the base plate between the opposed upright members whereby the sheet is removed from the bottom of the stack, and a gate located at the opposite end of the base plate from said stop for restraining the movement of all except the bottommost sheet.

12. Feeding apparatus according to claim 11, wherein a cam moves the stop conjointly with the rotatable members.

13. For sorting sheet material according to the thickness of each sheet, apparatus comprising means for feeding the sheets successively along a main path, a first deflector operable to divert individual sheets from said main path to a branch path, a second deflector operable to divert sheets from said branch path, gauging means located before said deflectors in said main path and responsive to said sheets and adjustable through various conditions according to the varying thickness of each sheet as it is fed thereby, two switching means operably connecting said gauging means and said first and second deflectors respectively, said gauging means having a least thickness condition corresponding to a predetermined least thickness of sheet in which it causes one of said switching means to operate said first deflector, and each gauging means having a maximum thickness condition corresponding to a predetermined maximum thickness of sheet in which it causes the other of said switching means to operate said second deflector, whereby sheets diverted from said main path by the first deflector are sorted according to the range of variation between least and maximum thickness, and sensing means adjacent said gauging means for rendering the least thickness switching means operative only when a sheet is fed to said gauging means.

14. For sorting sheet material according to the thickness of each sheet, apparatus comprising means for feeding the sheets successively along a main path, a plurality of gauging means along said main path responsive to said sheets and adjustable thereby through various conditions according to the varying thicknesses of each sheet as it is fed thereby, operably connected with and following each gauging means a deflector for diverting individual sheets from said main path into a branch path, each gauging means having a predetermined least thickness condition corresponding to a predetermined least sheet thickness in which condition it is effective to operate its deflector, an auxiliary deflector in said branch paths respectively and operably connected to its respective gauging means, each gauging means also having a maximum thickness condition corresponding to a maximum sheet thickness in which it is effective to operate its auxiliary deflector whereby after said first deflector diverts sheets of said predetermined least thickness to said branch path said second deflector diverts from the branch path sheets whose thicknesses vary more than the difference between said least and maximum thicknesses, and sensing means adjacent said gauging means for rendering the least thickness switching means operative only when a sheet is fed to said gauging means.

References Cited in the file of this patent

UNITED STATES PATENTS

| | | |
|---|---|---|
| 1,645,118 | Seabright | Oct. 11, 1927 |
| 1,691,313 | Toohey | Nov. 13, 1928 |
| 1,738,818 | Cogswell | Dec. 10, 1929 |
| 1,930,266 | Ford | Oct. 10, 1933 |
| 1,943,940 | Macadie et al. | Jan. 16, 1934 |
| 2,073,697 | Johnston | Mar. 16, 1937 |
| 2,146,581 | Kaufman | Feb. 7, 1939 |
| 2,290,852 | Donovan | July 28, 1942 |
| 2,368,796 | Ardell | Feb. 6, 1945 |
| 2,382,885 | Landay et al. | Aug. 14, 1945 |
| 2,393,614 | Curtis | Jan. 29, 1946 |
| 2,591,047 | Burge et al. | Apr. 1, 1952 |